Feb. 24, 1948.    G. L. TAWNEY    2,436,408
RADIO WAVE REFLECTING TRANSDUCER SYSTEM
Filed May 27, 1943    2 Sheets-Sheet 1
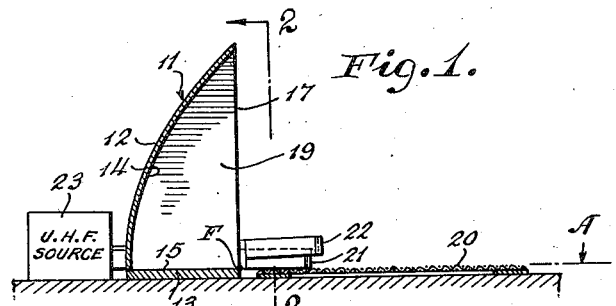
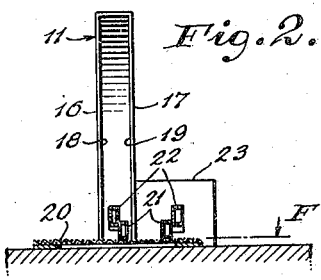
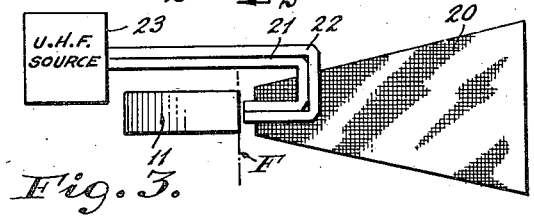
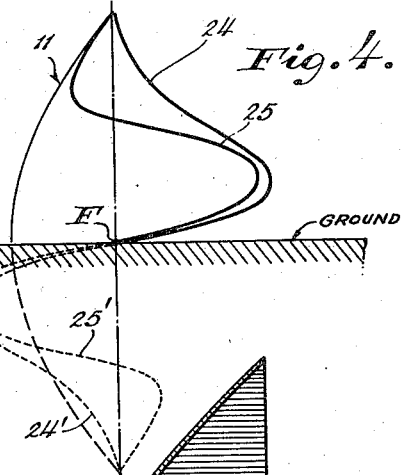
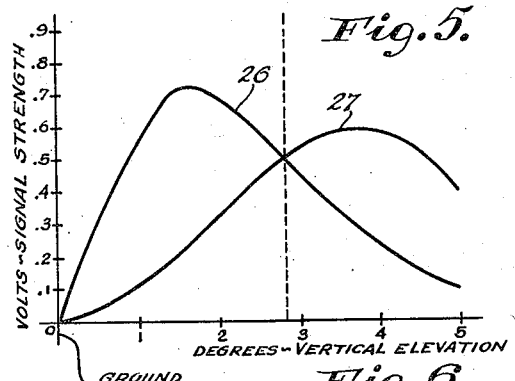
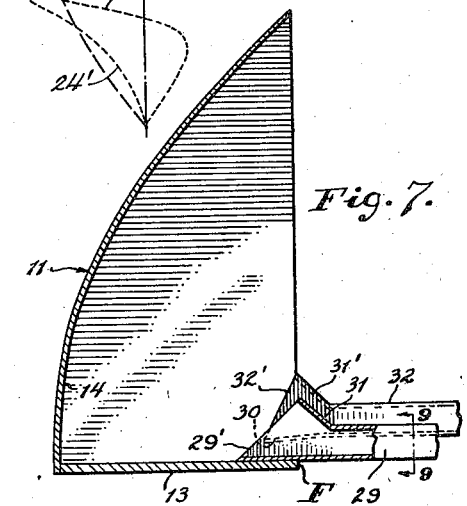
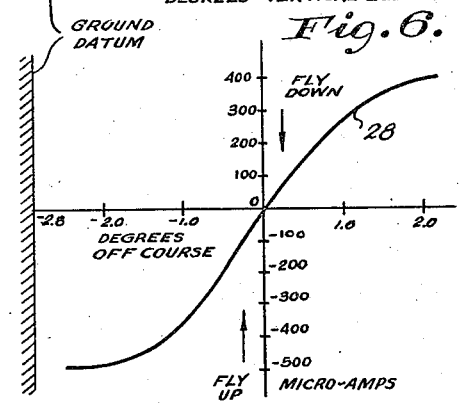
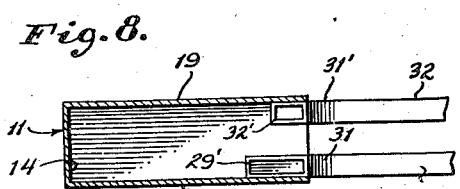
INVENTOR
GERELD L. TAWNEY
BY Paul B. Hunter
ATTORNEY

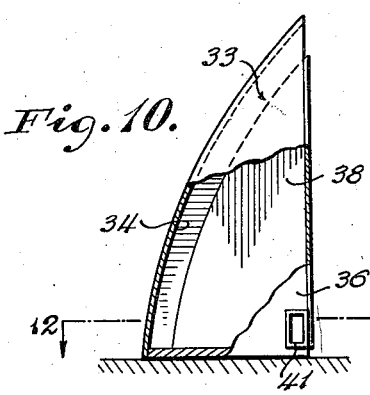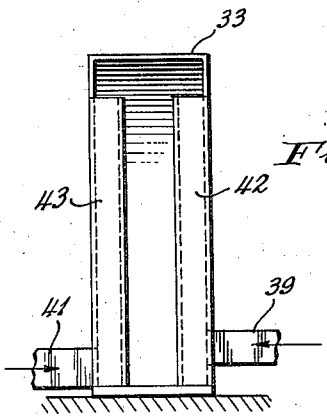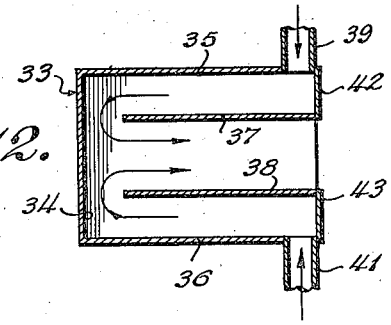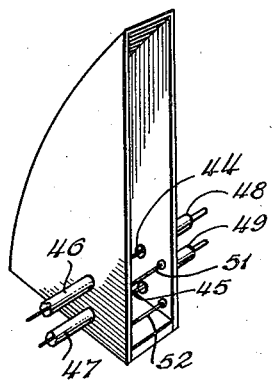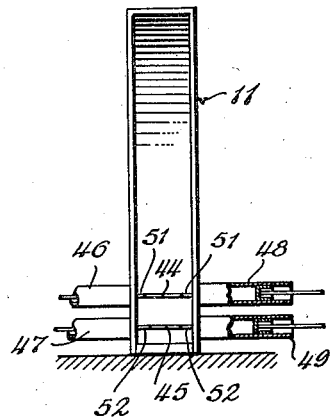

Patented Feb. 24, 1948

2,436,408

UNITED STATES PATENT OFFICE 2,436,408

RADIO WAVE REFLECTING TRANSDUCER SYSTEM

Gereld L. Tawney, Hempstead, N. Y., assignor to The Sperry Corporation, a corporation of Delaware Application May 27, 1943, Serial No. 488,695

30 Claims. (Cl. 250—11)

This invention relates to energy translation apparatus and methods and is especially concerned with transducer systems for launching electromagnetic wave energy into space in predetermined directional patterns, and for receiving the same.

In its preferred embodiment, the invention will be described as applied to the projection of directional beams of ultra high frequency wave energy into space from a special transmitting reflector device into which ultra high frequency energy is fed by wave guides. As will appear, however, this illustrative arrangement is not the only form the invention may embody, the true scope of the invention being apparent from the claims.

The term "transducer" as used herein is generic to devices both for transmitting and receiving electromagnetic wave energy. The term "reflecting transducer" as used herein is generic to transducers having appreciable preformed surface area, as distinguished from transducers of the wire or antenna type.

To my knowledge, in most reflecting transducer directional beam systems, as wherein parabolic or like reflectors are employed to project directional beam patterns of horizontally polarized electromagnetic wave energy into space, care is generally taken to so dispose the reflector and shape the beam as to avoid ground reflection of the beams as much as possible. This is done because horizontally polarized radiation generally produces ground reflections that are phase-reversed with respect to the waves emitted directly from the reflector. The interference of direct and reflected components gives rise to distorted beam patterns. Heretofore this distortion has been considered objectionable in many systems, and many arrangements have been proposed for its elimination or correction. For example, in United States Letters Patent No. 1,944,563, a parabolic reflector is located at such a distance above the ground that the ground-reflected wave components theoretically become in phase with the directly projected waves for certain elevation angles.

According to my invention, no attempt is made to minimize or counteract ground reflection, and instead ground reflection is actually constructively utilized to obtain or receive desirable directional radio beam patterns.

It is therefore a major object of the present invention to provide a reflecting transducer system adapted to utilize ground reflections for reliably obtaining or receiving directional beam patterns.

A further object of the invention is to provide a novel reflecting transducer system which is compact and has physical dimensions advantageously smaller than known similarly functioning systems. Specifically, I employ a half parabola reflector as a reflecting transducer.

It is a further object of the invention to provide a reflecting transducer provided with novel energy feed arrangements.

A further object of the invention is to provide novel half parabola reflecting transducer and associated energy feeding arrangements.

Further objects of the invention will appear as the description proceeds in connection with the appended claims and the revised drawings wherein:

Fig. 1 is a side elevation partly in section of a half parabola reflector and wave guide feed system comprising a preferred embodiment of the invention;

Fig. 2 is a front elevation, partly in section along line 2—2 of Fig. 1, of the system of Fig. 1;

Fig. 3 is a top plan view of the reflecting transducer system of Fig. 1;

Fig. 4 is an explanatory diagram illustrating the real and virtual image field distribution across the mouth of the reflecting transducer of Fig. 1;

Figs. 5 and 6 are explanatory graphs illustrating correlated relative beam intensity and instrument response obtainable with use of the invention in an instrument landing system for aircraft;

Fig. 7 is a side elevation in partial section illustrating an assembly having one type directional feed wave guide for the reflecting transducer;

Fig. 8 is a partly sectional top plan view of the assembly of Fig. 7;

Fig. 9 is a section along line 9—9 of Fig. 7;

Fig. 10 is a side elevation partly in section of a further embodiment of the invention wherein the energy feed wave guides discharge into passages within the reflector;

Fig. 11 is a front elevation of the device of Fig. 10;

Fig. 12 is a section along line 12—12 of Fig. 10;

Fig. 13 is a perspective view of a half parabola reflector fed with energy by dipole radiators; and Fig. 14 is a top plan view partly in section of the device in Fig. 13.

Referring now to Figs. 1-3, the illustrated transducer system is designed for projecting into space a pair of associated beams of ultra high frequency electromagnetic wave energy. The particular illustrated transducer system may be part of an instrument landing system for aircraft.

A reflector member 11 is formed with a backing wall 12 and a horizontal bottom wall 13 adapted to rest flush with the ground or a suitable flat platform substantially at ground level. Inner surface 14 is formed of metal or some other conductive material shaped to serve as a directive reflector of electromagnetic wave energy. Surface 14 is preferably arcuate and, in the illustrative example, comprises the upper half of a cylindrical parabola having its transverse focal axis along a line F perpendicular to the plane of the paper in Fig. 1. As illustrated, the surface 14 lies along the portion of a parabolic curve extending from the vertex to the latus rectum, the latter being a line perpendicular to the directive axis of the parabola passing through the focus thereof. The junction of reflector surface 14 and horizontal bottom wall 13 occurs at the vertex of the parabolic curve of the reflector surface, which lies on the directive axis of the parabolic reflector surface. If desired, surface 14 may be spherical, elliptical or any suitable surface of cylindrical generation, depending on the beam patterns desired. Also, surface 14 may be of stepped construction in approximation of the above shapes. Bottom surface 15 is preferably horizontal and substantially at ground level and substantially level with focal line F.

The directive axis A of surface 14 is preferably substantially at ground level and perpendicular to focal axis F.

As shown in Fig. 2, the reflector is relatively narrow, having upright side walls 16 and 17 extending forwardly to the focal axis. The inner surfaces 18, 19 of the side walls are smooth and lie in parallel planes perpendicular to surface 15, and this arrangement guides the waves reflected from surface 14. In order to prevent the side and bottom wall surfaces from absorbing any energy, these surfaces are preferably made conductive. Preferably surfaces 14, 15, 18 and 19 are formed from a single seamless piece of sheet copper or the like.

A pair of hollow metal rectangular wave guides 21 and 22, of usual construction, are arranged with their open mouths closely adjacent the open end of reflector 11. Lower wave guide 21 is disposed substantially at ground level, while upper wave guide 22 is mounted in predetermined vertically displaced relation thereto. Wave guides 21 and 22 are fed from source 23 with differently modulated ultra high frequency energy inputs, so that their associated reflected beams can be distinguishable in a suitable aircraft receiver as in usual instrument landing systems. The above described arrangement of wave guide feed and half parabola reflector, wherein the wave guides deliver ultra high frequency electromagnetic wave energy into the half parabola reflector adjacent its focal axis, results in reflector surface 14 projecting into space two angularly displaced but overlapping beams corresponding respectively in character to the vertically displaced wave guide feeds. As illustrated in Figs. 4 and 5, these beams are not exactly regular or symmetrical about individual axes as has heretofore been considered desirable in prior instrument landing systems, but are somewhat modified due to the ground reflected contribution to the pattern.

In Fig. 4, dotted lines below reflector 11 indicate the effective location of the virtual or image source for the ground reflected waves. Contributions from the real and virtual sources combine to produce the relative field distribution adjacent the reflector mouth which is indicated at 24 and 25 in Fig. 4. This field distribution in turn produces the unsymmetrical intensity distribution of the two emergent beams indicated at 26 and 27 in Fig. 5.

An important part of my invention is the discovery that, by thus taking advantage of and using ground reflections, energy may be fed into and projected by the half parabola reflector in such manner that the intensity distribution of energy across each of the resultant projected unsymmetrical beams varies smoothly so that overlap of the beams defines a definite region wherein an aircraft may readily determine its location by reference to relative strength of the beams. As shown in Fig. 5, each projected beam has a definite intensity peak. For example, the lower beam has highest intensity at substantially 1.6 degrees vertical elevation, and the higher beam has highest intensity at substantially 3.6 degrees vertical elevation. Thus the beams are distinct and definable.

Moreover, as shown in Fig. 4, there is, in spite of modification due to ground reflection, a smoothly varying field distribution across the parabola mouth, which is desirable for preventing unwanted side lobes in the beam patterns, and which is very important in producing the required beam patterns.

Fig. 6 illustrates the nature of the response which would be obtained in aircraft borne instrument landing equipment containing a cross pointer meter, if the latter were moved along an arc in a vertical plane across the beam overlap region. The smooth, almost linear curve 28, is quite symmetrical about the defined flight course, and at the zero point where the curve crosses the on course indication, there is equisignal response to the two beams.

Location of the wave guide mouths transversely to the reflector does not seem to be particularly critical, although such position as will result in minimum obstruction of the reflected beam is desirable.

Care, however, must be taken to locate the wave guide mouths in proper vertical location relative both to the focal axis F of the parabola and to each other. The lower beam in Fig. 5 results from energy fed by lower wave guide 21, while the upper beam in Fig. 5 results from energy fed by upper wave guide 22. Note that the lower beam is of higher maximum intensity and has a relatively sharp rate of rise and a slow rate of decay which is desirable. When wave guide 21 delivers energy substantially at the focal axis of the parabola, it produces a beam having a peak of maximum intensity as illustrated. The upper beam has a relatively slow rise and a satisfactory rate of decay. The effect of displacing either wave guide 21 or 22 upward, vertically, would be to slow the rate of rise and lower the maximum beam intensity of the respective beams. Hence, both wave guide mouths are located as close as possible to the ground level for maximum radiation but with the necessary relative vertical separation. It is the relative vertical displacement of the wave guide mouths which determines the effective angular cooperation of their resultant beams in defining the required equisignal flight path.

The vertical location of the wave guide mouth or nozzle has therefore been found to determine the angle that the beam axis, which beam axis may be defined as the straight line from the parabola source through the above-mentioned beam intensity peak, makes with the horizontal. This fact is taken advantage of to produce the overlapping beams of the invention, and shows that either beam angle may be varied with respect to ground or other datum, by vertical displacement of the corresponding wave guide mouth.

Location of each wave guide mouth in the direction of axis A relative to the reflection is also fairly critical. Displacement of the wave guide mouth toward or from the reflector results in a slight shift in the beam axis angle, and best results are obtained when the energy is discharged substantially at the focus of the half parabola as illustrated. The effective center of propagation of the wave energy launched from the ends of the non-directional wave guides is usually considered to be adjacent to the wave guide ends, and wave guide 21 is located in Fig. 1 so that effective center is located on focus F. Displacement of either wave guide mouth toward or from the reflector changes the beam intensity distribution and hence the beam axis angle, but shift in the beam axis angle is preferably controlled by relative vertical separation of the wave guide mouths as above explained.

I have found that best results are obtained when the invention is used on substantially level ground as illustrated, and tilt of the parabola is avoided.

In Fig. 1, a substantially horizontal metal wire mesh screen frame 20 is illustrated on the ground in front of the half parabola reflector. This may be employed to increase the beam intensity when desired, as where the ground in front of the reflector is rough or grassy. Frame 20 does not materially alter the beam distribution pattern, and as shown it may serve to partially support the wave guide ends.

I have found it most efficient for the energy conducting wave guides to be excited in such mode that the lines of E of the electromagnetic field therealong are parallel to the ground, or horizontal. This produces the required horizontally polarized radiation in the beams.

Figs. 7, 8 and 9 illustrate a directive wave guide termination which may be employed instead of the non-directive wave guide mouths shown in Fig. 1. Wave guide 29, which is rectangular in cross-section like wave guides 21 and 22, is formed with an upwardly flared mouth defined by inclined top wall 31. For optimum results in most assemblies, the flared mouth of wave guide 29 is located so as to obtain desired control and shape of the emergent beam. The termination of lower wave guide 29 usually simply rests on bottom wall 13 of the parabola for support.

All of the above considerations as to non-directive wave guide feeds apply in general to directive wave guide feeds. The chief advantage of directional feed is that the resultant beam pattern can be better controlled and shaped. The directional feed gives good control over the field distribution across the parabola mouth, and this distribution determines the beam pattern in space. Upper wave guide 32 is vertically spaced from guide 29 so as to provide a distinct upper beam as in Fig. 1. As shown in Fig. 8, wave guides 29 and 32 are secured to opposite side walls of reflector 11 so as not to obstruct reflected energy in the center of the beam.

In Fig. 7, the preformed directive wave guide terminations are preferably defined by one or more outwardly inclined wave guide walls. For example the vertical angular spread of the wave energy issuing from guide 29 is defined by the lower wave guide wall resting on half parabola base 13 and by upper inclined wall 31. The vertical angular spread of the wave energy issuing from guide 32 is defined by oppositely inclined wave guide walls 31' and 30. Both terminations have mouths inclined rearwardly and away from the half parabola base so as to insure proper directivity of the issuing wave energy toward the available reflector surface.

These preformed wave guide terminations give excellent controlled discharge of wave energy into the reflector and provide maximum utilization of the reflector surface. While the illustrated terminations are narrow to suit the narrow reflector shown, they may be widened suitably as desired. Obviously the shape of such wave guide terminations may be varied from that shown for obtaining directional discharge of wave energy as desired without departing from the spirit of the invention.

The wave guides of all the above embodiments, if desired, may be integrally or rigidly attached to the parabola mouth, or may be extended through or along the bottom or side walls of the half parabola and suitably shaped to direct energy upon the parabolic reflecting surface, to reduce interception of the reflected waves.

For example, Figs. 10-12 illustrate a half parabola reflector wherein energy is fed into side wall passages which discharge close to the reflecting surface.

Half parabola 33 includes a rear wall having a reflecting surface 34 of the required curvature, and parallel side walls 35 and 36. Interiorly, a pair of partition walls 37 and 38 are provided in parallel spaced relation to side walls 35 and 36. Wave guides 39 and 41 extend through walls 35 and 36 to discharge energy into the passages between walls 35 and 37 on one side, and into the passages between walls 36 and 38 on the other side. The front ends of the passages are closed as by vertical walls 42 and 43. Wave guide 39 is arranged at a higher level than guide 41, so as to obtain the required difference in beam angle for producing overlapping beams as above explained.

As shown in Fig. 12, walls 37 and 38 terminate short of surface 34 so that energy emerging from the side wall passages and reflected from surface 34 may be directed outwardly substantially centrally of the reflector and along a path which is not obstructed by energy feed devices. This arrangement of energy feeds is novel in all types of reflecting transducers in addition to the illustrated half-parabola.

Further, while wave guide feeds for the energy to be reflected have been described in detail, I may for example employ other feeds embodying dipoles or other radiating antennae for the same purpose without departing from the broader spirit of the invention.

In Figs. 13 and 14, for example, half parabola reflector 11 is provided with vertically spaced antenna elements 44 and 45 for feeding wave energy into the reflector. Antenna elements 44 and 45 are energized through concentric lines 46 and 47 and are formed at their opposite ends with adjustable impedance matching stub terminations 48 and 49. I may preferably employ reflecting antenna elements 51 and 52 of the same type horizontally aligned with and spaced about a quarter-wavelength from each antenna element 46 or 47, for increasing and assisting in direction of the energy input to the reflector from antenna elements 46 and 47.

The vertical spacing of antennae 46 and 47 is so arranged as to produce required energy distribution and beam patterns similar to those described above for the apparatus of Fig. 1; the wave guides and antennae being substantially equivalent energy feeds for the purpose. This arrangement of reflecting transducer energy feed is also not limited to half-parabola type devices, but may be employed with any reflecting transducer.

While a half-parabola or the like comprises the preferred reflector of the invention, the reflector may be made slightly larger to take care of finite dimensions of the energy feeds, or otherwise altered in consideration of other practical factors which may have similar small effects on the beam patterns. The term "substantially half-parabola" used herein is intended to embrace all such equivalent reflector sizes.

My half parabola is only about five feet high as used in practice, and therefore offers a far smaller obstruction on the airfield than the twelve foot high full parabola hitherto used. There is also a considerable saving in manufacture and material because of the smaller size. It is to be appreciated of course that the half parabola of the invention involves considerably more than the idea of merely dividing the known full parabola into two parts and using the upper half, since a half parabola, so obtained by division of a full parabola which produces satisfactory beams, will not be capable of utilizing ground reflection in the manner of the invention. The half parabola of the invention, on the other hand, is especially designed to utilize ground reflections to obtain the desired beam patterns.

While the preferred embodiment of the invention has been described as a directional transmitter, its directional characteristics may be employed to equal advantage as a directional receiver as in usual antenna practice, the illustrated energy feeding devices being replaced by suitable detectors.

Further, the term "ground level" as used herein may refer to the earth or any equivalent datum surface cooperating with the reflector.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A reflecting transducer system comprising a concave reflector having beam forming surface portions producing a directive axis, means mounting said reflector with its directive axis substantially at ground level, and electromagnetic wave energy translation means positioned adjacent said axis for cooperation with said reflector.

2. A reflecting transducer system comprising an arcuate reflector having a substantially horizontal axis of directivity and mounted with a focus at substantially ground level, and electromagnetic wave energy translation means positioned adjacent said focus.

3. The system defined in claim 2, wherein said translation means comprises a pair of vertically displaced energy translation devices at the mouth of said reflector.

4. A reflecting transducer system comprising a laterally facing substantially cylindrical reflector mounted with its focal line horizontally positioned at ground level, and electromagnetic wave energy translation means positioned adjacent said focal line for interchanging electromagnetic energy with said reflector.

5. A reflecting transducer system comprising a generally horizontally facing arcuate reflector mounted with its focus substantially at ground level, and means for feeding electromagnetic wave energy into said reflector at vertically displaced stations adjacent said focus for obtaining predetermined smoothly varying field distributions of reflected energy at the mouth of said reflector, said field distributions being such as to provide two correlated overlapping beams of said energy in space.

6. The system defined in claim 5, wherein said means for feeding said wave energy comprises wave guide means having discharge mouths facing said reflector.

7. A reflecting transducer system comprising a generally horizontally facing substantially half parabola reflector having a supporting base adjacent its focus by which said reflector may be mounted upright with its focus near ground level, and means for feeding electromagnetic wave energy into said reflector adjacent said focus.

8. The system defined in claim 7, wherein said last-named means comprises two wave guide discharge nozzles, one of said nozzles being located substantially at the focal axis of said parabola, and the other being located in predetermined vertically displaced relation thereto.

9. A reflecting transducer system comprising a generally horizontally facing arcuate reflector mounted with its focus substantially at ground level, and means for feeding electromagnetic wave energy into said reflector comprising a wave guide having a preformed directional nozzle extending within and facing said reflector.

10. The system defined in claim 9, wherein said reflector has a bottom wall adapted to rest on the ground or a supporting platform near ground, and said wave guide nozzle is supported by said bottom wall.

11. An electromagnetic wave energy reflector comprising means defining a beam forming reflecting surface, means defining beam guiding parallel side walls near said reflecting surface, energy translation means for interchanging electromagnetic energy with said reflecting surface, and means defining a beam guiding bottom wall on said reflector adjacent said translation means.

12. A reflecting transducer system comprising a generally laterally facing reflector having a pair of opposite side walls, and wave guide nozzles secured to said opposite side walls for feeding electromagnetic wave energy to said reflector.

13. A reflecting transducer system comprising a generally laterally facing reflector having beam forming surface portions, and a pair of vertically spaced antenna elements arranged at the mouth of said reflector for wave energy translation with said reflector.

14. A reflecting transducer system comprising a generally laterally facing reflector having beam forming surface portions, lateral side walls on said reflector, spaced partitions within said reflector forming with said walls passages at the sides of said reflector, said passages being open to said reflector surface, and electromagnetic wave energy conducting means coupled to said passages.

15. Energy supply means for a reflecting transducer or the like comprising a wave guide for conducting electromagnetic energy, and an enlarged discharge termination on said guide preformed to provide controlled directional discharge of said wave energy toward said transducer or the like for optimum energy exchange therewith.

16. Energy supply means comprising an electromagnetic wave conducting guide, wall means on said guide providing an enlarged preformed termination adapted to produce directive discharge of wave energy therefrom, and means defining a substantially rearwardly inclined discharge mouth on said termination.

17. A reflecting transducer comprising a beam forming reflector, a pair of vertically displaced antenna elements operatively associated with said reflector surface for energy translation therewith, and reflecting means for said antenna elements for aiding in the directivity of said translation.

18. A reflecting transducer comprising a beam forming reflector, a pair of antenna elements disposed across the mouth of said antenna for energy radiation or reception, energy feeding means for said antenna elements, and means terminating said antenna elements.

19. A reflecting transducer system comprising a reflector having a beam-forming concave surface portion defining a directive axis and a horizontal transverse focal line, vertical conductive side walls connected to said concave surface portion to form therewith an opening for directive energy passage, and means for mounting said reflector with said transverse focal line substantially at ground level.

20. A reflecting transducer system as defined in claim 19 further including electromagnetic wave energy translation means positioned adjacent said transverse focal axis for cooperation with said reflector.

21. A reflector transducer system comprising a reflector having a beam-forming concave parabolic surface portion defining a vertex, a latus rectum, and a focal zone; means mounting said parabolic reflector with said vertex substantially at ground level and said latus rectum substantially vertical; and electromagnetic wave energy translation means positioned adjacent said focal zone for cooperation with said reflector.

22. A reflecting transducer system for cooperating with a substantially planar reflector, comprising a parabolic reflector having a beam-forming concave parabolic surface portion defining a vertex, a latus rectum, and a focal zone; means mounting said parabolic reflector with said vertex adjacent said planar reflector and said latus rectum substantially perpendicular to said planar reflector; and electromagnetic wave energy translation means positioned adjacent said focal zone for cooperation with said parabolic reflector.

23. A reflecting transducer system for cooperating with a substantially planar reflector to produce a directivity pattern, comprising a parabolic reflector having a beam-forming concave surface of parabolic cross-section defining a vertex, a latus rectum, a focal point, and an axis of directivity extending from said vertex through said focal point; means for mounting said parabolic reflector with said directive axis extending along said planar reflector and said latus rectum extending perpendicular to said planar reflector; and electromagnetic energy translation means for transferring electromagnetic energy between said translation means and said parabolic reflector.

24. A reflecting transducer system for cooperating with a datum surface to produce a directivity pattern, comprising a parabolic reflector having a beam-forming concave parabolic surface defining a vertex, a directive axis intersecting said vertex, a focal axis transversely intersecting said directive axis, and a latus rectum passing through said focal axis perpendicular to said directive axis; means for mounting said parabolic reflector with said vertex substantially on said datum surface and said latus rectum substantially perpendicular to said datum surface; and electromagnetic energy translation means adjacent said focal point for communicating electromagnetic energy with said parabolic reflector.

25. A reflecting transducer system for cooperating with a substantially planar reflector comprising a parabolic reflector having a beam-forming concave parabolic surface portion defining a vertex, a focus, and a directive axis extending from said vertex through said focus; means for mounting said parabolic reflector with said directive axis extending along said planar reflector; and electromagnetic wave energy translation means adjacent said focus for electromagnetic energy transfer between said translation means and said parabolic reflector.

26. A reflecting transducer for high-frequency electromagnetic waves comprising a conductive cylindrical parabolic reflector wall defining a focal axis and a vertex, parallel conductive side walls connected to said parabolic reflector wall and extending toward said focal axis and perpendicular thereto, and a further planar conductive wall connected to said parabolic reflector wall and said side walls perpendicular to said side walls, said further wall adjoining said parabolic wall substantially at the vertex thereof, whereby a rectangular mouth is formed by said parabolic reflector wall, said side walls and said further wall.

27. The reflecting transducer defined in claim 26, further including electromagnetic energy translation means adjacent said mouth for interchanging energy with said parabolic reflector.

28. A reflecting transducer for high-frequency electromagnetic waves, comprising a conductive cylindrical parabolic reflector wall defining a focal axis and a vertex, and substantially parallel conductive side walls joined to said parabolic reflector wall and extending toward said focal axis and substantially perpendicular thereto, said side walls and said reflector wall being asymmetrical about the plane through said focal axis and said vertex, and extending substantially equal distances from said plane.

29. A reflecting transducer for high-frequency electromagnetic waves, comprising a conductive parabolic reflector wall defining a focus and a vertex, substantially parallel conductive side walls joined to said parabolic reflector wall and extending toward the region of said focus, said side walls and said reflector wall being substantially bounded by a plane perpendicular to said side walls and passing through said focus and said vertex, and electromagnetic energy translation means positioned in said focal region for reception or transmission of energy reflected by said parabolic reflector.

30. A reflecting transducer as defined in claim 29, wherein said energy translation means is directional and is aimed toward said parabolic reflector principally at an angle from said plane passing through said focus and said vertex, whereby the energy interchange with a region of said reflector displaced from said vertex is enhanced relative to the interchange with said vertex.

GERELD L. TAWNEY.

REFERENCES CITED

The following references are of record in the file of this patent:

UNITED STATES PATENTS

| Number | Name | Date |
| --- | --- | --- |
| 1,944,563 | Kruesi | Jan. 23, 1934 |
| 2,072,262 | Herzog et al. | Mar. 2, 1937 |
| 2,112,282 | Fritz | Mar. 29, 1938 |
| 2,153,589 | Peterson | Apr. 11, 1939 |
| 1,820,004 | Kruesi | Aug. 18, 1931 |
| 2,130,913 | Tolson | Sept. 20, 1938 |